US009146721B1

(12) United States Patent
Nagaraja et al.

(10) Patent No.: US 9,146,721 B1
(45) Date of Patent: Sep. 29, 2015

(54) INSTALLATION OF A SOFTWARE AGENT VIA AN EXISTING TEMPLATE AGENT

(71) Applicant: VMware, Inc., Palo Alto, CA (US)

(72) Inventors: Vishwas Nagaraja, San Jose, CA (US); Intesar Mohammed, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/292,654

(22) Filed: May 30, 2014

(51) Int. Cl.
*G06F 9/44* (2006.01)
*G06F 9/45* (2006.01)
*G06F 9/445* (2006.01)
*G06F 9/455* (2006.01)

(52) U.S. Cl.
CPC .. *G06F 8/60* (2013.01); *G06F 8/61* (2013.01); *G06F 9/45533* (2013.01)

(58) Field of Classification Search
None
See application file for complete search history.

(56) References Cited

U.S. PATENT DOCUMENTS

| 7,549,149 | B2 | 6/2009 | Childress et al. | |
|---|---|---|---|---|
| 8,171,470 | B2 | 5/2012 | Goldman et al. | |
| 2010/0138823 | A1 | 6/2010 | Thornley | |
| 2011/0251992 | A1* | 10/2011 | Bethlehem et al. | 707/610 |
| 2012/0054736 | A1 | 3/2012 | Arcese et al. | |
| 2013/0232497 | A1 | 9/2013 | Jalagam et al. | |
| 2013/0232498 | A1 | 9/2013 | Mangtani et al. | |
| 2013/0268674 | A1 | 10/2013 | Bailey et al. | |

FOREIGN PATENT DOCUMENTS

| WO | 2013104217 A1 | 7/2013 |
|---|---|---|
| WO | 2013184134 A1 | 12/2013 |

OTHER PUBLICATIONS

International Search Report and Written Opinion dated Jul. 9, 2015, International Application No PCT/2015/033044, 9 pages.
International Search Report and Written Opinion dated Jul. 21, 2015, International Application No. PCT/2015/033394, 9 pages.

* cited by examiner

*Primary Examiner* — Chuck Kendall

(57) ABSTRACT

A system for adapting virtual computing resource (e.g., virtual machine) templates for use with new software platforms without modifying, or otherwise requiring recertification of, the template itself is disclosed. The system enables the installation of a software agent to be bootstrapped to the installation and execution of an agent already included in a template. Installation of the bootstrapped software agent may be performed automatically during initial provisioning of a virtual machine with little or no additional effort required from an administrator. Accordingly, embodiments of the disclosure enable preexisting templates to repurposed for use with new and/or more advanced cloud management platforms.

20 Claims, 4 Drawing Sheets

INSTALLATION OF A SOFTWARE AGENT VIA AN EXISTING TEMPLATE AGENT

BACKGROUND

"Infrastructure-as-a-Service" (also commonly referred to as "IaaS") generally describes a suite of technologies provided by a service provider as an integrated solution to allow for elastic creation of a fully virtualized network and pooled computing platform (sometimes referred to as "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

A cloud computing platform may include one or more virtual machines that are instantiated and provisioned based on the contents of a virtual machine template (e.g., cloud template) created by a developer or provided by a cloud provider. For example, cloud templates may include metadata that describes the configuration of a virtual machine, including CPU, memory, network, storage, guest operating system, and other supporting libraries preinstalled and used to repeatedly create a VM having the specified settings. Additionally, an administrator may specify a logical template that may be mapped to a particular cloud template. As with cloud templates, a logical template may specify virtual computing resources for a virtual machine, such as CPU, memory, networking, storage, guest operating system, preinstalled runtime environments (e.g., Java Runtime Environment), and application services and commands (e.g., ssh, wget). As part of the logical template definition, an administrator may further specify one or more software services that are preinstalled on the logical template. For example, in some cases, a performance monitoring agent or virus scanner is preinstalled on a logical template.

After a template has been created, the template may be subjected to rigorous testing as part of a certification process before the template can be utilized by an enterprise. For example, before use in a production environment, a template may be tested to ensure compatibility with different software and hardware platforms, reliability in various environments and use cases (e.g., under heavy user traffic), and/or compliance with certain security and regulatory standards. Further, if a certified template is modified, the modified template cannot be used in an enterprise until the modified template has been recertified. Consequently, once a template has been created and certified, an administrator is typically reluctant to make changes to the template.

However, in many cases, the structure, size, and/or business needs of an enterprise may change, necessitating additional and/or different components to be included in a particular template. Consequently, when a new software service must be added to a certified template, an administrator typically must painstakingly update each template used by an enterprise. Moreover, the updated templates must then be submitted for recertification. As such, there are challenges faced by system administrators and other users when attempting to update a template to add or remove software services.

SUMMARY

Embodiments of the disclosure provide a system for adapting virtual computing resource (e.g., virtual machine) templates for use with new software platforms without modifying, or otherwise requiring recertification of, the template itself. The system enables the installation of a software agent to be bootstrapped to the installation and execution of an agent already included in a template. Installation of the bootstrapped software agent may be performed automatically during initial provisioning of a virtual machine with little or no additional effort required from an administrator. Accordingly, embodiments of the disclosure enable preexisting templates to be repurposed for use with new and/or more advanced cloud management platforms.

A method includes, in an embodiment, responsive to a request to deploy a multi-tier application on a plurality of virtual machines (VMs), provisioning a VM based on a template, wherein the template comprises a template agent. The method further includes executing the template agent to receive a script from a first server and executing the script to install a software agent on the provisioned VM. The software agent is configured to facilitate deployment of at least a portion of the multi-tier application onto the provisioned VM.

A non-transitory computer-readable storage medium including instructions that, when executed in a computing device, perform the steps of, in an embodiment, responsive to a request to deploy a multi-tier application on a plurality of virtual machines (VMs), provisioning a VM based on a template, wherein the template comprises a template agent. The non-transitory computer-readable storage medium further includes instructions for executing the template agent to receive a script from a first server and executing the script to install a software agent on the provisioned VM. The software agent is configured to facilitate deployment of at least a portion of the multi-tier application onto the provisioned VM.

A computer system, including a system memory and a processor programmed to carry out the steps of, in an embodiment, responsive to a request to deploy a multi-tier application on a plurality of virtual machines (VMs), provisioning a VM based on a template, wherein the template comprises a template agent. The system memory and processor are further programmed to carry out the steps of executing the template agent to receive a script from a first server and executing the script to install a software agent on the provisioned VM. The software agent is configured to facilitate deployment of at least a portion of the multi-tier application onto the provisioned VM.

DETAILED DESCRIPTION

Figure 1:
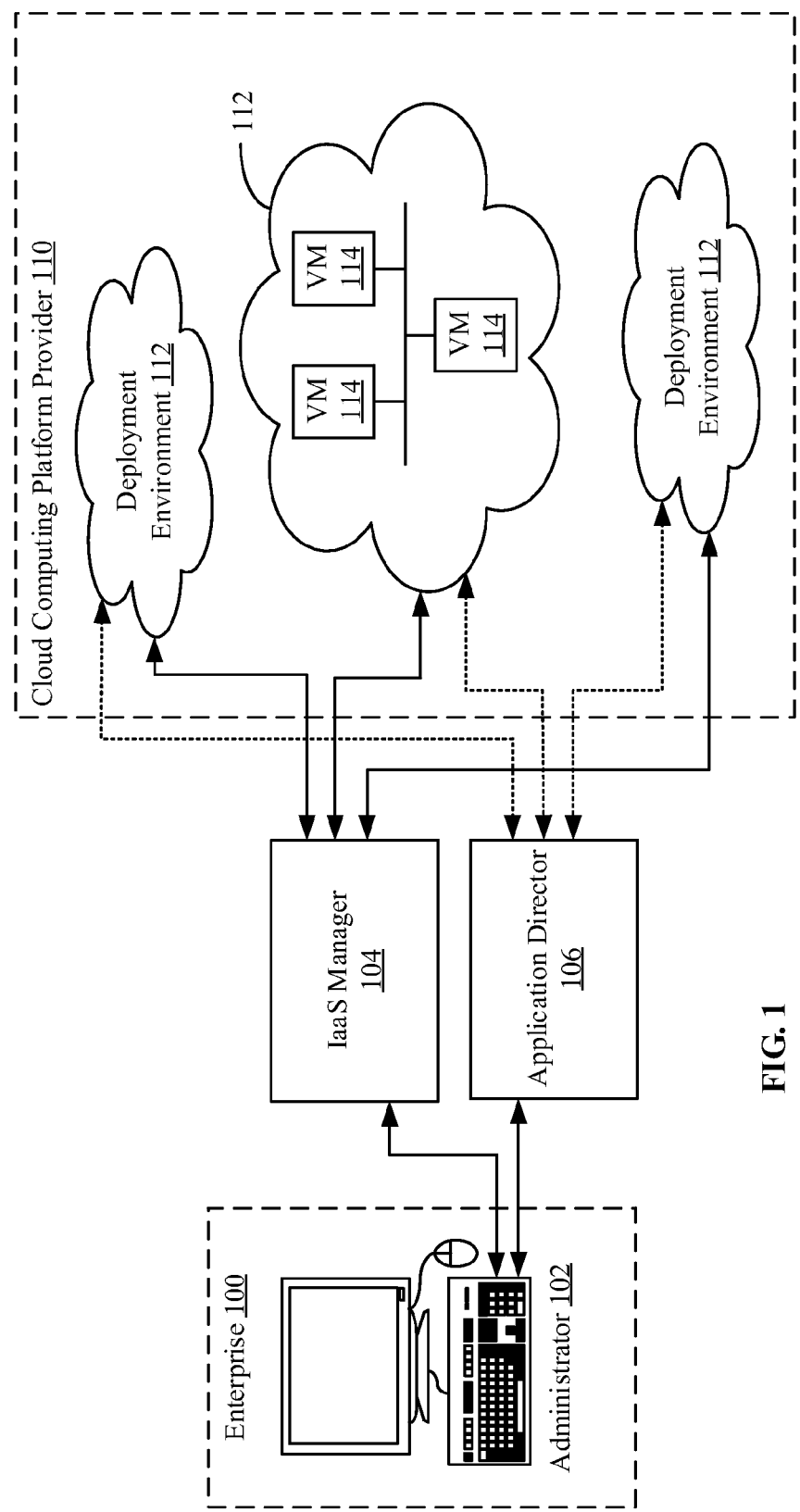
FIG. 1 depicts one embodiment of a system for deploying an application on multiple cloud computing environments.

FIG. 1 depicts one embodiment of a system for deploying an application on multiple cloud computing environments. In this embodiment, a multi-tier application is being deployed for enterprise 100 in a deployment environment 112 provided by a cloud computing platform provider 110 (sometimes referred to simply as "cloud provider"). As depicted in FIG. 1, cloud computing platform provider 110 may provide multiple deployment environments 112, for example, for development, testing, staging, and production of the application. Enterprise 100 may access services from cloud computing platform provider 110, for example, via REST (Representational State Transfer) APIs (Application Programming Interface) or any other client-server communication protocol. One particular implementation of a REST API for cloud computing services is vCloud Director API available from VMware, Inc. Cloud computing platform provider 110 provisions virtual computing resources (e.g., virtual machines, or "VMs," 114) to provide a deployment environment 112 in which enterprise 100 can deploy its multi-tier application. One particular example of a deployment environment is one implemented using cloud computing services from a vCloud DataCenter available from VMware, Inc. Cloud computing platform provider 110 is shown in greater detail and discussed below in conjunction with FIG. 2.

As shown in FIG. 1, an administrator 102 of enterprise 100 may interact with an infrastructure-as-a-service (IaaS) manager 104 and an application director 106, each of which may be running in one or more VMs, to manage a multi-tiered application deployed on cloud computing platform provider 110. In some embodiments, IaaS manager 104 includes a platform that supports the creation and deployment of VMs 114 in cloud computing environments. Administrator 102 may interact with IaaS manager 104 to define and deploy VMs 114 for use in cloud-based applications. For example, if administrator 102 wishes to define a cloud-based data storage application, IaaS manager 104 may be used to deploy one or more VMs 114 to run an application component that is responsible for data storage, an application component that is responsible for providing data security, and an application component for providing a web-based application interface. IaaS manager 104 may then perform simple configuration tasks on the one or more VMs 114 to be provisioned in conjunction with the deployment of the application.

To streamline the process of configuring and provisioning VMs 114 and other types of virtual resources, IaaS manager 104 may generate and store various templates that define configuration parameters to be used to instantiate virtual resources in a cloud. Each template may include a copy of a VM 114 that has, for example, certain processor capabilities, memory and storage sizes, network resources, and the like. Templates may further include preinstalled application components that are executed once a VM 114 has been provisioned. For example, a template may include or reference an IaaS agent that is to be installed and executed to communicate with IaaS manager 104 once a VM 114 has been instantiated and provisioned, enabling the IaaS agent to receive instructions, a hostname, binaries, etc. from IaaS manager 104. For example, once a VM 114 has been instantiated and IaaS agent has been installed, IaaS agent may communicate with IaaS manager 104 in order to receive a series of tasks specific to the receiving VM 114. The tasks may include scripts that are executed by VMs 114 to install, configure, and/or start one or more application components. For example, a task may be a script that, when executed by a VM 114, causes VM 114 to retrieve and install certain software packages from a central package repository 134.

Although IaaS manager 104 enables a user to perform basic configuration and provisioning operations to deploy a simple cloud application, when more advanced management operations and/or more complex topologies are to be implemented, the user may instead wish to utilize the additional functionality of application director 106. Application director 106 enables a user to orchestrate deployment of a multi-tier application onto multiple deployment environments 112 provided by one or more cloud computing platform providers 110 using software modules including, for example, a topology generator, a deployment plan generator, and a deployment director. The topology generator may be configured to generate an application blueprint that specifies a logical topology of an application to be deployed. For example, a blueprint generated by application director 106 for an online store application may specify a web application (e.g., in the form of a Java web application archive or "WAR" file comprising dynamic web pages, static web pages, Java servlets, Java classes, and other property, configuration and resources files that make up a Java web application) executing on an application server (e.g., Apache Tomcat application server) and that uses as a database (e.g., MongoDB) as a data store. A blueprint may be assembled out of items from a catalog, which is a listing of available virtual computing resources (e.g., VMs, networking, storage) that may be provisioned from cloud computing platform provider 110 and available application components (e.g., software services, scripts, code components, application-specific packages) that may be installed on the provisioned virtual computing resources. The deployment plan generator of application director 106 may be configured to generate a deployment plan based on a blueprint that includes deployment settings (e.g., processor capabilities, memory and storage sizes, network resources, etc.) and an execution plan of tasks having a specified order in which virtual computing resources are provisioned and application components are installed, configured, and started. The deployment director of application director 106 may be configured to execute a deployment plan by communicating with one or more cloud computing platform providers 110 to provision and configure VMs 114 in a deployment environment 112.

As described above, both IaaS manager 104 and application director 106 enable administrator 102 to instantiate and provision VMs 114 using virtual machine templates (e.g., cloud templates) provided by a cloud provider and/or generated by administrator 102. In general, a template generated for use with IaaS manager 104 includes a preinstalled agent, referred to herein as an IaaS agent, that is configured to communicate with IaaS manager 104 in order to receive custom properties for customizing a provisioned VM 114. Similarly, a template generated for use with application director 106 includes an agent, referred to herein as an application director agent, that is configured to communicate with application director 106 in order to receive a list of tasks to be performed by a receiving VM 114. After a template has been created, the template is subjected to rigorous testing as part of a certification process before the template can be utilized by enterprise 100. Further, if a certified template is modified by administrator 102, the modified template cannot be used in enterprise 100 until the modified template has been recertified.

Although IaaS agent may be capable of communicating with IaaS manager 104 and, optionally, application director 106 to perform basic tasks, such as receiving and executing scripts, IaaS agent cannot be used to implement many of the advanced functions offered by application director 106. For example, IaaS agent is unable to receive and execute deployment plans generated by application director 106, which may provide a step-oriented view of an application topology defined in an application blueprint, specify time dependencies between deployment tasks, and provide settings, such as cloud templates, networks, and application component properties to be used in specific deployment environments 112.

Consequently, if the structure, size, and/or business needs of enterprise 100 change, administrator 102 may wish to implement various functions provided by application director 106 and the application director agent. Previously, in order to implement the advanced functionality and topologies offered by application director 106, a template that includes only IaaS agent—intended for use with IaaS manager 104—must be modified to have the application director agent installed. However, in embodiments of the disclosure, various techniques may be implemented to install and execute the application director agent using an agent (e.g., IaaS agent) that is already included in a certified template, as described below in further detail. Thus, administrator 102 is able to use existing templates—designed for use with one software package (e.g., IaaS manager 104)—with a newly implemented software package (e.g., application director 106) without modifying or recertifying the existing templates.

Installation of a Software Agent Via an Existing Template Agent

Figure 2:
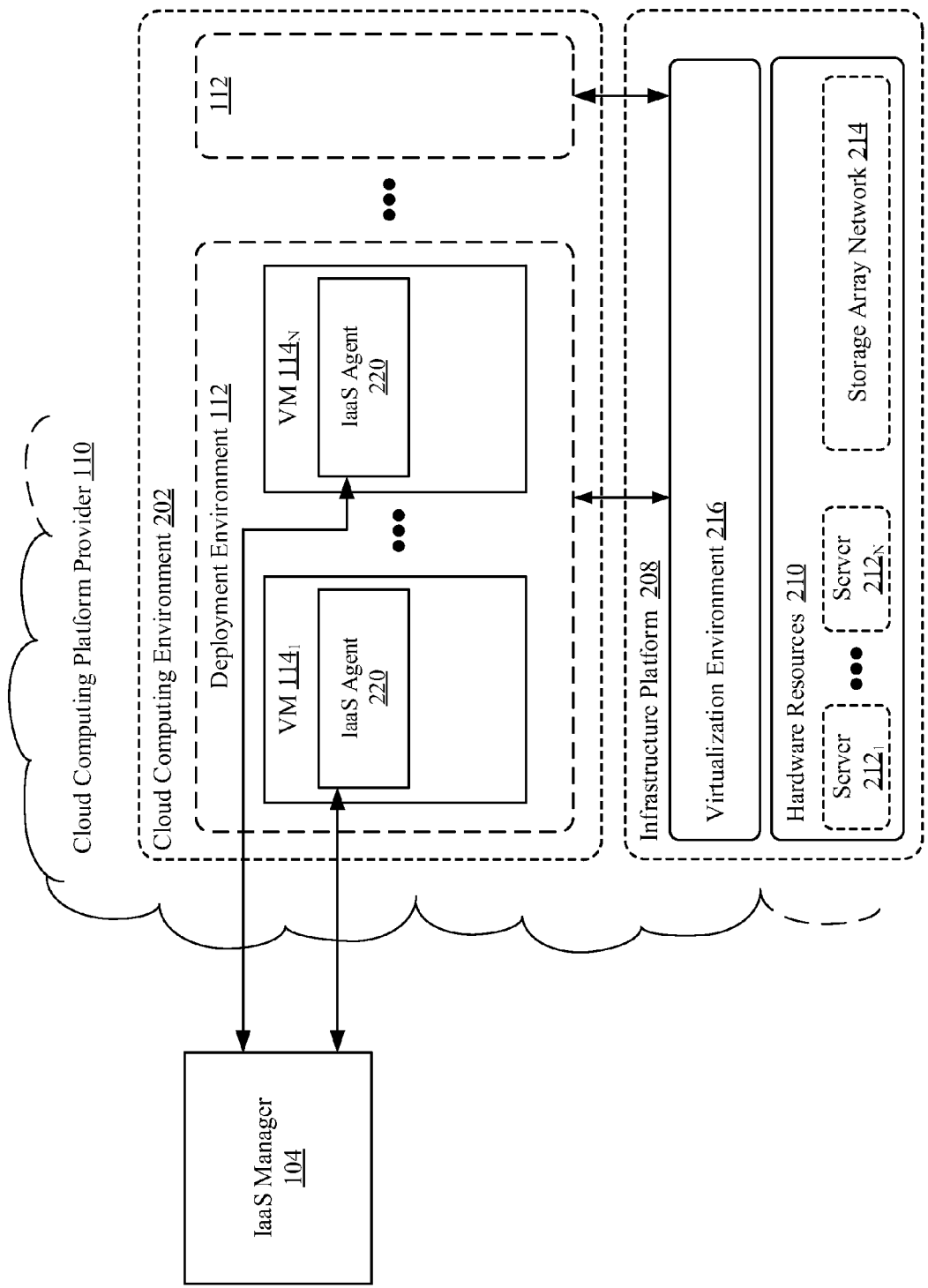
FIG. 2 depicts an example cloud computing platform provider with which embodiments of the present invention may be utilized.

FIG. 2 depicts an example cloud computing platform provider 110 with which embodiments of the present invention may be utilized. As described above, enterprise 100 may deploy or manage an application within a deployment environment 112 provided by cloud provider 110. For example, once administrator 102 generates and/or selects one or more templates to be used for a particular application deployment, IaaS manager 104 communicates with cloud provider 110 to instantiate and provision VMs 114 within a deployment environment 112 based on the template(s). Cloud provider 110 may utilize a cloud computing environment 202 accessible, for example, via REST (Representational State Transfer) APIs (Application Programming Interface) or any other client-server communication protocol, to enable administrator 102 to provision virtual computing resources.

Cloud provider 110 utilizes an infrastructure platform 208 upon which a cloud computing environment 202 may be executed. In the particular embodiment of FIG. 2, infrastructure platform 208 comprises hardware resources 210, such as servers $212_1$ to $212_N$ and one or more storage array networks (SAN), such as SAN 214, which are configured in a manner to provide a virtualization environment 216 that supports the execution of a plurality of virtual machines across servers $212_1$ to $212_N$. As further detailed below, these virtual machines provide the virtual computing resources (e.g., compute, networking, and storage resources) that make up cloud computing environment 202.

Infrastructure resources included in virtualization environment 216 of FIG. 2 may be provided to cloud computing environment 202 in response to provisioning requests received from IaaS manager 104. For example, IaaS manager 104 may request a specified number of virtual machines to deploy a web application or to modify (e.g., scale) a currently running web application. Responsive to this request, virtualization environment 216 instantiates virtual machines, for example, according to a cloud template that defines a virtual machine having specified virtual computing resources (e.g., compute, networking, storage resources). In one example, virtualization environment 216 may be implemented by running VMware ESX™-based hypervisor technologies, provided by VMware, Inc. of Palo Alto, Calif., on servers $212_1$ to $212_N$ (although it should be recognized that any other virtualization technologies, including Xen® and Microsoft Hyper-V virtualization technologies may be utilized consistent with the teachings herein).

As shown in FIG. 2, VM $114_1$ has been instantiated using a certified template designed for use with IaaS manager 104. As such, VM $114_1$ includes IaaS agent 220, which, after instantiation of VM $114_1$, communicates with IaaS manager 104 to enable administrator 102 to receive custom properties to customize VM $114_1$, such as by modifying the hostname and virtual computing resources (e.g., memory size) allocated to VM $114_1$. However, because VM $114_1$ does not yet include a full-featured agent that is capable of performing advanced operations, such as the complex application deployment tasks described above, under the direction of application director 106, administrator 102 is able to perform only basic customizations of VM $114_1$.

Figure 3:
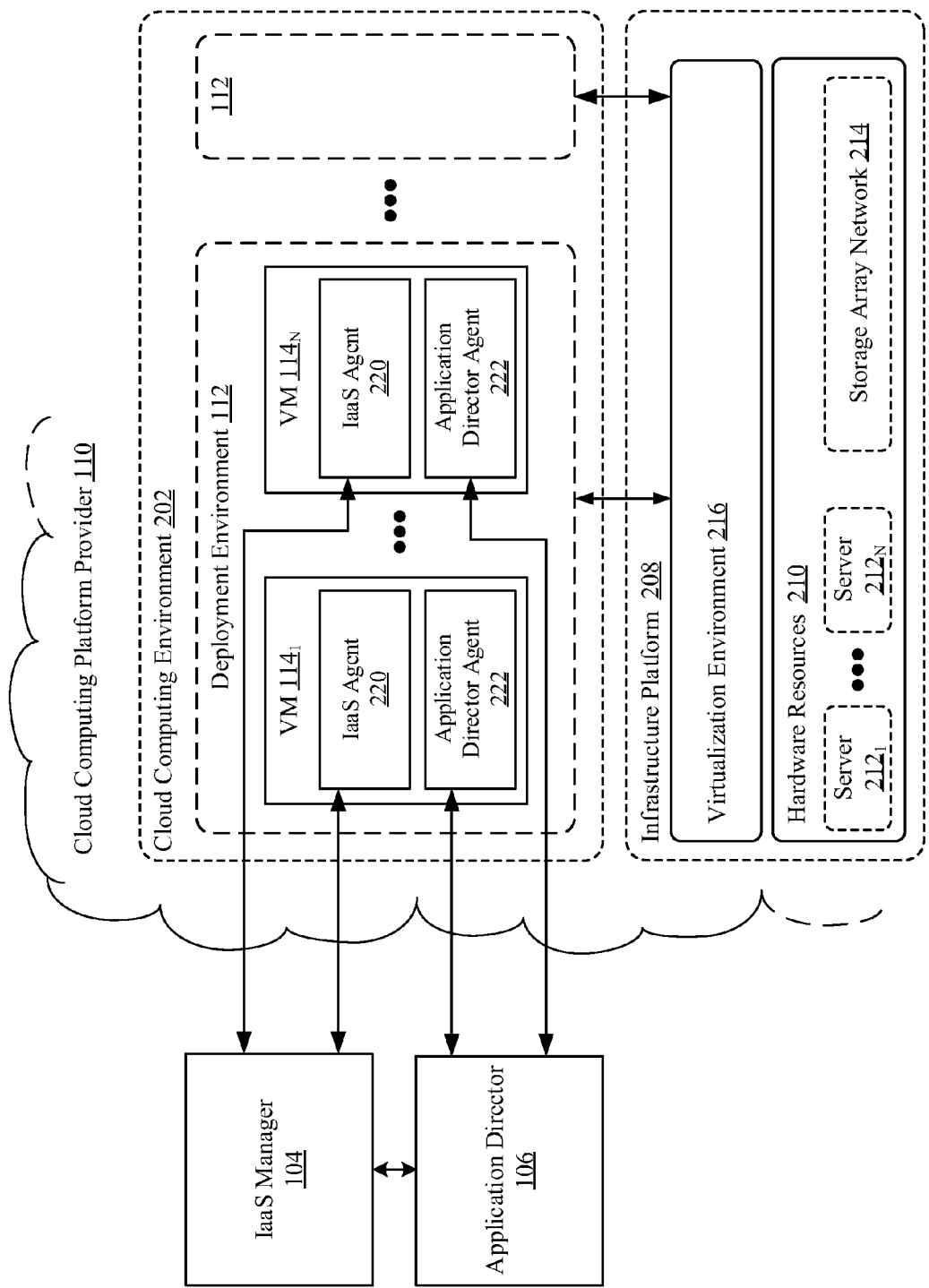
FIG. 3 depicts an example cloud computing platform provider with which a virtual machine (VM) adapted to communicate with an application director has been provisioned with which embodiments of the present invention may be utilized.

In various embodiments of the disclosure, as shown in FIG. 3, after instantiation of VM $114_1$, installation of an application director agent 222 may be bootstrapped to the installation and execution of IaaS agent 220, such as by passing a script to IaaS agent 220 that instructs IaaS agent 220 to download, install, and execute application director agent 222. Accordingly, VM $114_1$—instantiated and provisioned using a template designed for use with IaaS manager 104—is able to communicate with application director 106 without modification to the template itself. Thus, templates designed for use with IaaS manager 104 may be repurposed, for example, when enterprise 100 migrates to the more advanced functionality and topologies provided by application director 106, without requiring each template to be recertified. Further, installation of application director agent 222 may be automated such that templates can be used to provision VMs 114 capable of communicating with application director 106 with little or no additional effort from administrator 102.

Once application director agent 222 is installed, application director agent 222 may then communicate directly with application director 106. For example, upon execution of application director agent 222, application director agent 222 may receive and implement various application deployment instructions to deploy and manage a multi-tiered application, such as the multi-tiered applications described above in conjunction with FIG. 1.

Figure 4:
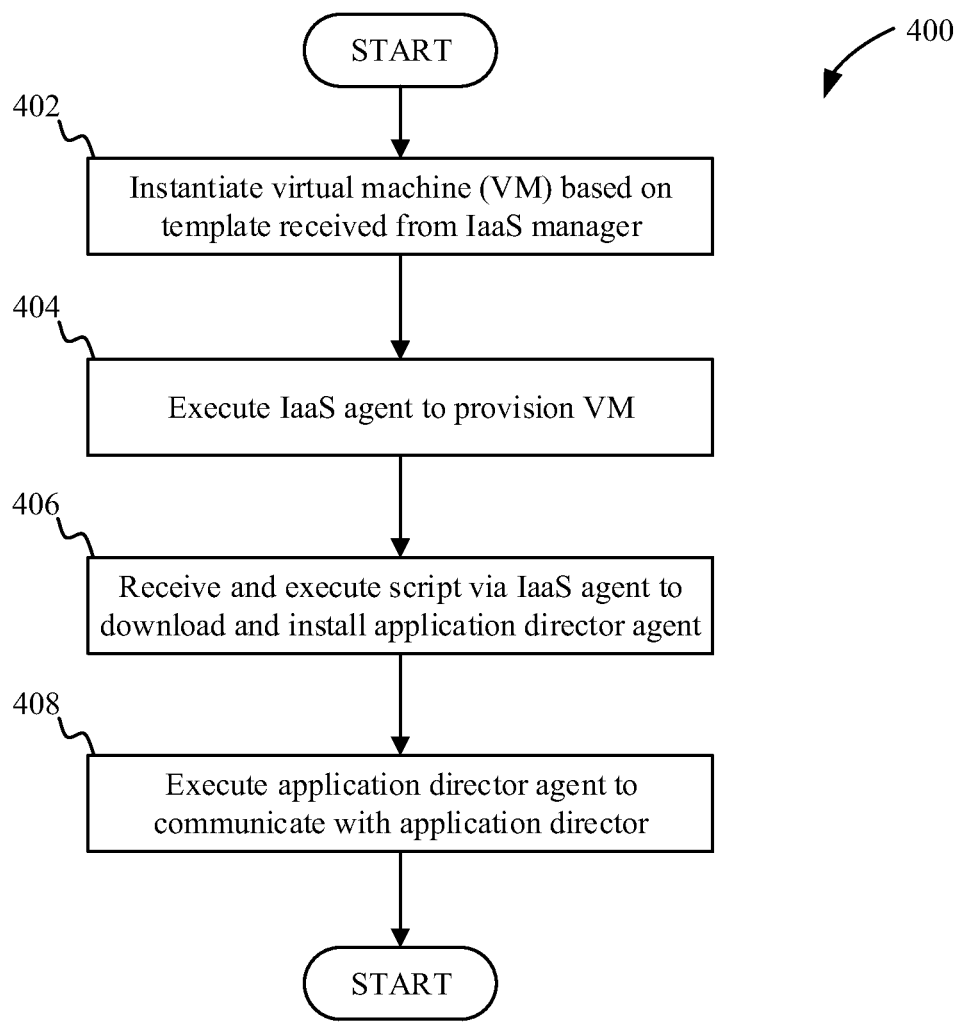
FIG. 4 is a flow diagram of an exemplary method for installing an application director agent on a VM in a cloud computing environment.

FIG. 4 is a flow diagram of an exemplary method for installing application director agent 222 on a virtual machine (VM) in a cloud computing environment. It should be recognized that, even though the steps of FIG. 4 are described in conjunction with the systems of FIGS. 1-3, any system configured to perform the method steps, in any order, is within the scope of embodiments of the invention.

In step 402, cloud computing platform provider 110 instantiates a VM 114 (e.g., via a module included in virtualization environment 216) based on a template provided to the cloud computing platform provider 110. In some embodiments, VM 114 is instantiated when a multi-tiered application is deployed by application director 106 and/or IaaS manager 104 based on a template that is designed for use with IaaS manager 104. Once instantiated, VM 114 includes one or more agents, such as IaaS agent 220, that are included in the template.

At step 404, VM 114 executes IaaS agent 220 to customize VM 114. IaaS agent 220 may be executed upon boot-up of the instantiated VM 114. Upon execution, IaaS agent 220 uses one or more scripts and configuration files specified by IaaS manager 104 to customize VM 114. In some embodiments, IaaS agent 220 may receive a plurality of custom properties from IaaS manager 104 that IaaS agent 220 uses to customize the VM. For example, IaaS agent 220 may receive a custom property (e.g., VirtualMachine.DiskN.Size=16) that defines a size (e.g., in GB) to give a particular disk N of the VM.

At step 406, IaaS agent 220 receives and executes a script that causes IaaS agent 220 to download and install application director agent 222. A variety of techniques may be used to install application director agent 222 via IaaS agent 220. For example, application director agent 222 may be installed while IaaS agent 220 is automatically performing a series of actions associated with a "ticket" during initial provisioning of VM 114. In some embodiments, after instantiation of VM 114, IaaS agent 220 may communicate with IaaS manager 104 to receive a script (e.g., a bootstrap script) that provides IaaS agent 220 with a location from which application director agent 222 may be downloaded. IaaS agent 220 then downloads one or more application files (e.g., binaries) from this location to install and execute application director agent 222. In some embodiments, the script includes a batch file having a series of commands (e.g., wget, apt-get) to be executed by IaaS agent 220. Alternatively, application director 106 may communicate with IaaS manager 104 and transmit application files associated with application director agent 222 to IaaS agent 220 via IaaS manager 104. IaaS agent 220 may then use these application files to install application director agent 222. In other embodiments, IaaS agent 220 may receive a script or application files, such as the script and application files described above, from IaaS manager 104 or from another management application that facilitates instantiation and/or provisioning of VM 114.

According to one or more embodiments, at step 406, IaaS agent 220 may receive a custom property (e.g., ApplicationDirector.BootStrapScript.contents) containing the boot strap script contents and execute the contents of the bootstrap script to install application director agent 222. In alternative embodiments, IaaS agent 220 may receive one or more custom properties (e.g., ApplicationDirector.BootStrapScript.url, ApplicationDirector.BootStrapScript.path, etc.) that specify a remote or local location at which the bootstrap script is located. The bootstrap script may then be downloaded and executed to install application director agent 222. As described in conjunction with FIGS. 2 and 3, a script and/or application files associated with application director agent 222 may be received by IaaS agent 220 from application director 106, from a repository, etc. In other embodiments, the script and/or application files may be received from IaaS manager 104 or another management application that is in communication with IaaS agent 220.

Once application director agent 222 has been installed, at step 408, application director agent 222 is executed by VM 114 to communicate with application director 106, such as by authenticating itself with application director 106 to establish a secure method of communication. Application director agent 222 then broadcasts its availability for use in deploying an application in conjunction with application director 106.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. For example, while embodiments herein have referred to certain methods for bootstrapping the installation of application director agent 222 using IaaS agent 220, it should be recognized that other types of agents running on VM 114 may be utilized to install application director agent 222 and/or other types of software modules in alternative embodiments. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:
1. A method, comprising:
responsive to a request to deploy a multi-tier application on a plurality of virtual machines (VMs) using a first server to orchestrate a deployment of the multi-tier application, provisioning a VM based on a template generated for use with a second server, wherein the template comprises a template agent configured for communication with the second server;
executing the template agent to receive a script; and executing the script to install a software agent on the provisioned VM, wherein the software agent is configured for communication with the first server to facilitate deployment of at least a portion of the multi-tier application onto the provisioned VM.

2. The method of claim 1, further comprising executing the software agent to receive application deployment instructions from the first server.

3. The method of claim 2, wherein the application deployment instructions specify a plurality of application deployment tasks and time dependencies associated with the plurality of application deployment tasks.

4. The method of claim 1, wherein the template is a certified template that does not include the software agent.

5. The method of claim 1, wherein executing the script causes the template agent to receive and execute at least one binary file that comprises the software agent.

6. The method of claim 1, wherein, upon executing the template agent, the template agent automatically receives a configuration file from the second server and configures the VM based on the configuration file.

7. The method of claim 1, wherein executing the template agent and executing the script are automatically performed after provisioning the VM.

8. The method of claim 1, further comprising executing the software agent to receive application deployment instructions from the first server, and wherein executing the template agent, executing the script, and executing the software agent are performed without intervening input from a user.

9. The method of claim 1, further comprising transmitting, via the template agent, a request for the script to the first server.

10. A non-transitory computer-readable storage medium comprising instructions that, when executed in a computing device, perform the steps of:
   responsive to a request to deploy a multi-tier application on a plurality of virtual machines (VMs) using a first server to orchestrate a deployment of the multi-tier application, provisioning a VM based on a template generated for use with a second server, wherein the template comprises a template agent configured for communication with the second server;
   executing the template agent to receive a script; and
   executing the script to install a software agent on the provisioned VM, wherein the software agent is configured for communication with the first server to facilitate deployment of at least a portion of the multi-tier application onto the provisioned VM.

11. The non-transitory computer-readable storage medium of claim 10, further comprising instructions that, when executed in the computing device, perform the step of executing the software agent to receive application deployment instructions from the first server.

12. The non-transitory computer-readable storage medium of claim 11, wherein the application deployment instructions specify a plurality of application deployment tasks and time dependencies associated with the plurality of application deployment tasks.

13. The non-transitory computer-readable storage medium of claim 10, wherein the template is a certified template that does not include the software agent.

14. The non-transitory computer-readable storage medium of claim 10, wherein executing the script causes the template agent to receive and execute at least one binary file that comprises the software agent.

15. The non-transitory computer-readable storage medium of claim 10, wherein, upon executing the template agent, the template agent automatically receives a configuration file from the second server and configures the VM based on the configuration file.

16. The non-transitory computer-readable storage medium of claim 10, wherein executing the template agent and executing the script are automatically performed after provisioning the VM.

17. The non-transitory computer-readable storage medium of claim 10, further comprising instructions that, when executed in the computing device, perform the step of executing the software agent to receive application deployment instructions from the first server, and wherein executing the template agent, executing the script, and executing the software agent are performed without intervening input from a user.

18. The non-transitory computer-readable storage medium of claim 10, further comprising instructions that, when executed in the computing device, perform the step of transmitting, via the template agent, a request for the script to the first server.

19. A computer system, comprising:
   a system memory; and
   a processor configured to execute instructions stored in the system memory to:
   responsive to a request to deploy a multi-tier application on a plurality of virtual machines (VMs) using a first server to orchestrate a deployment of the multi-tier application, provision a VM based on a template generated for use with a second server, wherein the template comprises a template agent configured for communication with the second server;
   execute the template agent to receive a script; and
   execute the script to install a software agent on the provisioned VM, wherein the software agent is configured for communication with the first server to facilitate deployment of at least a portion of the multi-tier application onto the provisioned VM.

20. The computer system of claim 19, wherein the processor is further configured to execute the software agent to receive application deployment instructions from the first server.

* * * * *